United States Patent
Zhou et al.

(10) Patent No.: US 10,453,010 B2
(45) Date of Patent: Oct. 22, 2019

(54) COMPUTER DEVICE, METHOD, AND APPARATUS FOR SCHEDULING BUSINESS FLOW

(71) Applicant: Huawei Technologies Co., Ltd., Shenzhen (CN)

(72) Inventors: Junjie Zhou, Nanjing (CN); Vemana Narasimha Murthy, Shenzhen (CN); Upasana Haveri, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 738 days.

(21) Appl. No.: 15/153,204

(22) Filed: May 12, 2016

(65) Prior Publication Data

US 2016/0260040 A1  Sep. 8, 2016

Related U.S. Application Data

(63) Continuation of application No. PCT/CN2014/089703, filed on Oct. 28, 2014.

(30) Foreign Application Priority Data

Nov. 14, 2013 (CN) .......................... 2013 1 0567968

(51) Int. Cl.
*G06Q 10/06* (2012.01)
*G06F 9/48* (2006.01)

(52) U.S. Cl.
CPC ..... *G06Q 10/06311* (2013.01); *G06F 9/4843* (2013.01)

(58) Field of Classification Search
CPC .................. G06Q 10/06311; G06F 9/4843
See application file for complete search history.

(56) References Cited

U.S. PATENT DOCUMENTS 6,434,710 B1  8/2002  Sato et al.
7,089,556 B2 *  8/2006  Fong ..................... G06F 9/5038
                                                                    703/2

(Continued)

FOREIGN PATENT DOCUMENTS

CN  101317160 A  12/2008
CN  102238465 A  11/2011

(Continued)

OTHER PUBLICATIONS

Islam, M., et al., "Oozie: Towards a Scalable Workflow Management System for Hadoop," Proceedings of the 1st ACM SIGMOD Workshop on Scalable Workflow Execution Engines and Technologies, Article No. 4, Retrieved from the Internet: URL: http://dl.acm.org/citation.cfm?id=2443420 [retrieved on Oct. 5, 2016], May 20, 2012, 10 pages.

(Continued)

*Primary Examiner* — Sujay Koneru
(74) *Attorney, Agent, or Firm* — Conley Rose, P.C.

(57) ABSTRACT

A computer device, a method, and an apparatus for business flow scheduling. The method for business flow scheduling includes determining that a transaction savepoint is configured on a to-be-scheduled node, creating an asynchronous task according to the transaction savepoint, where the asynchronous task includes a to-be-scheduled task that is on the to-be-scheduled node and that is after the transaction savepoint, using a first thread to execute a transaction that includes a task in the flow other than the asynchronous task, and submitting the transaction executed by the first thread in order to ensure data consistency, and using a second thread to execute the asynchronous task in order to implement transaction splitting between task nodes.

11 Claims, 5 Drawing Sheets

(56) References Cited

U.S. PATENT DOCUMENTS

| | | | | |
|---|---|---|---|---|
| 8,219,432 | B1* | 7/2012 | Bradley | G06Q 10/06311 705/7.13 |
| 9,378,117 | B2* | 6/2016 | Payne | G06F 11/3636 |
| 2002/0069192 | A1* | 6/2002 | Aegerter | G06F 16/25 |
| 2002/0174108 | A1 | 11/2002 | Cotner et al. | |
| 2004/0010499 | A1* | 1/2004 | Ghosh | G06F 16/2358 |
| 2005/0022157 | A1* | 1/2005 | Brendle | G06F 9/485 717/104 |
| 2006/0080394 | A1* | 4/2006 | Goodman | H04L 63/101 709/206 |
| 2007/0162520 | A1 | 7/2007 | Petersen et al. | |
| 2007/0226637 | A1* | 9/2007 | Yaseen | G06Q 10/00 715/762 |
| 2008/0071906 | A1 | 3/2008 | Thoennes et al. | |
| 2008/0263106 | A1* | 10/2008 | Asherman | G06F 9/5038 |
| 2010/0077068 | A1* | 3/2010 | Saha | G06F 9/5055 709/223 |
| 2010/0198908 | A1* | 8/2010 | Kumar | G06F 9/4843 709/203 |
| 2011/0066647 | A1 | 3/2011 | Chan et al. | |
| 2012/0072910 | A1* | 3/2012 | Martin | G06F 9/45533 718/1 |
| 2013/0007750 | A1 | 1/2013 | Beckerle et al. | |
| 2013/0104148 | A1* | 4/2013 | Torgersen | G06F 9/4498 719/320 |
| 2013/0117453 | A1* | 5/2013 | Bjerke | G06F 9/445 709/226 |
| 2013/0159472 | A1* | 6/2013 | Newton | H04L 67/2852 709/219 |
| 2013/0166588 | A1* | 6/2013 | Gruschko | G06F 16/24524 707/769 |
| 2014/0053157 | A1* | 2/2014 | Zhao | G06F 9/485 718/100 |
| 2014/0115024 | A1* | 4/2014 | Kriesing | G06F 9/4843 709/201 |
| 2015/0295844 | A1* | 10/2015 | Perreira | G06F 9/4843 709/226 |

FOREIGN PATENT DOCUMENTS

| | | |
|---|---|---|
| CN | 103077006 A | 5/2013 |
| CN | 103593236 A | 2/2014 |
| JP | 2000010810 A | 1/2000 |
| JP | 2004530213 A | 9/2004 |
| JP | 2010537338 A | 12/2010 |
| WO | 2012150510 A1 | 11/2012 |
| WO | 2013003443 A2 | 1/2013 |

OTHER PUBLICATIONS

Miller, J. A., et al., "Corba-Based Run-Time Architectures for Workflow Management Systems," Journal of Database Management Idea Group Publishing USA, vol. 7, No. 1, 1996, 24 pages.
Foreign Communication From a Counterpart Application, European Application No. 14862971.0, Extended European Search Report dated Oct. 19, 2016, 6 pages.
Partial English Translation and Abstract of Chinese Patent Application No. CN103077006, Aug. 3, 2016, 15 pages.
Partial English Translation and Abstract of Chinese Patent Application No. CN103593236, Apr. 28, 2016, 3 pages.
Foreign Communication From a Counterpart Application, PCT Application No. PCT/CN2014/089703, English Translation of International Search Report dated Jan. 20, 2015, 7 pages.
Foreign Communication From a Counterpart Application, PCT Application No. PCT/CN2014/089703, English Translation of Written Opinion dated Jan. 20, 2015, 8 pages.
Foreign Communication From a Counterpart Application, Chinese Application No. 201310567968.8, Chinese Office Action dated Apr. 1, 2016, 6 pages.
Foreign Communication From a Counterpart Application, Chinese Application No. 201310567968.8, Chinese Search Report dated Mar. 17, 2016, 2 pages.
Foreign Communication From a Counterpart Application, Chinese Application No. 2016-530910, Chinese Office Action dated May 9, 2017, 2 pages.
Foreign Communication From a Counterpart Application, Chinese Application No. 2016-530910, English Translation of Chinese Office Action dated May 9, 2017, 3 pages.

* cited by examiner

COMPUTER DEVICE, METHOD, AND APPARATUS FOR SCHEDULING BUSINESS FLOW

CROSS-REFERENCE TO RELATED APPLICATIONS

This application is a continuation of International Application No. PCT/CN2014/089703, filed on Oct. 28, 2014, which claims priority to Chinese Patent Application No. 201310567968.8, filed on Nov. 14, 2013, both of which are hereby incorporated by reference in their entireties.

TECHNICAL FIELD

The present disclosure relates to technologies of flow management, and in particular, to a computer device, a method, and an apparatus for scheduling a business flow.

BACKGROUND

A workflow is a business flow formed by interconnecting related business activities according to a time sequence or a logical relationship. During business operation, documents, information, or tasks are transferred, processed, or executed between multiple participants according to specifications of an organization. A most notable characteristic of a workflow technology is automation of a part or all of a business process in a computer application environment, where such processes generally refer to activities involving both human and machine participation, for example, interaction processes with information technology (IT) application programs and tools. A workflow includes a group of tasks (or activities) and a sequence relationship between the tasks (or activities), and further includes start conditions and end conditions of a flow and a task, and a description of each task.

A workflow management system refers to a system that defines, creates, and executes workflows. The system provides function support mainly in the following three aspects: a construction function, which defines and models workflow processes and activities thereof, an operation control function, which manages workflow processes in an operation environment and schedules activities in a workflow process, and an operation interaction function, which interacts with users (participants or controllers of business jobs) and external application programs during operation of workflows.

At present, the workflow technology is widely applied. For example, workflows are introduced to businesses of an enterprise for business flow management. A middleware suite related to business flow management (Business Process Management (BPM)) generally includes a modeling tool (responsible for business flow modeling), a BPM engine (responsible for business flow driving), a flow management console, and a technical framework platform. The middleware suite can be embedded into a business system to provide an upper-layer business with application programming interfaces (API) for process modeling and engine process instance scheduling in order to help the business complete orchestration, deployment, operation, and scheduling of flows, thereby creating, for enterprises, various flows aligned with business development of the enterprises.

FIG. 1 illustrates a schematic diagram of a typical business flow orchestrated using BPM. From information synchronization to order fulfillment is a complete account opening flow, where each activity from information synchronization through pricing synchronization to order fulfillment is a task. A business service is configured for each task, and the services are executed in a sequence pre-orchestrated in FIG. 1. Each task corresponds to one node during scheduling and execution of the flow. The account opening flow itself is not a concern of the present embodiment of the application and therefore is not described in detail herein.

With respect to a business flow, customer requirements include:

Requirement 1. The flow is able to start to execute business services in accordance with a business goal under a precondition of correct logic configuration until the end.

Requirement 2. The flow is able to record execution information in each step for business tracking and query.

Requirement 3. Data consistency with business data changes needs to be kept during forward flow of the flow.

Requirement 4. When an exception occurs on a node in the flow, the flow stops at the exceptional node, and retry upon failure or human intervention is supported, until the flow can continue to be executed, without affecting business service scheduling that has been completed.

Requirement 5. When an engine process terminates exceptionally, it may be necessary to support that execution is resumed from an uncompleted task upon restart of the process.

Requirement 6. Scheduling performance of the flow should be high.

In a prior-art solution, a visual flow orchestration tool is first used to complete service configuration and sequence orchestration for a definition of a business flow, a BPM engine drives the flow forward until completion, based on the foregoing orchestrated flow definition according to business inputs and call requests. A flow of the BPM engine is persisted to a database, and a transaction mechanism is used for control in the persistence process to ensure data consistency. To ensure that transactions between a BPM platform and a business system are scheduled uniformly, a same transaction framework, for example, a Spring transaction framework or another similar transaction framework, needs to be used for the business system and the BPM platform. Declarative transactions also need to be configured for the business to initiate calls to APIs of the BPM platform. A declarative transaction means that the transaction is handled by means of a declaration in a configuration file. An advantage of using declarative transactions is that when transaction management changes, it may be necessary to make reconfiguration in the configuration file, without a need to change code for recompilation. As the business calls a flow start API to drive the flow to flow forward, because transaction control is used, if an exception occurs on an intermediate node, a transaction is rolled back to a transaction start point, but rollback to the exceptional node is not supported and execution cannot be resumed from the exceptional node either.

Therefore, during business flow scheduling, the prior art cannot both ensure data consistency between a business system and a BPM platform and ensure that a flow terminates at an exceptional node upon occurrence of an exception and that execution is resumed from the exceptional node later.

SUMMARY

Embodiments of the present disclosure provides a computer device, a method, and an apparatus for scheduling a business flow, which can not only ensure data consistency between a business system and a BPM platform, but also ensure that a flow terminates at an exceptional node upon occurrence of an exception and that execution is resumed from the exceptional node upon recovery.

The technical solutions of the embodiments of the present disclosure are implemented as follows.

According to a first aspect, a computer device for executing flow scheduling is provided, which is configured to schedule and execute a flow, where the flow includes at least one node, and the computer device includes a memory and a processor, where the memory is configured to store an instruction of the computer device, and the processor is configured to execute the instruction in the memory so as to complete the following steps: determining that a transaction savepoint is configured on a to-be-scheduled node, creating an asynchronous task according to the transaction savepoint, where the asynchronous task includes a to-be-scheduled task that is on the to-be-scheduled node and that is after the transaction savepoint, using a first thread to execute a transaction that includes a task in the flow other than the asynchronous task, and submitting the transaction executed by the first thread, and using a second thread to execute the asynchronous task.

In a first possible implementation manner of the first aspect, the processor is further configured to place the asynchronous task into a to-be-scheduled task queue of a first flow engine process to which the first thread belongs.

With reference to the first possible implementation manner of the first aspect, in a second possible implementation manner, the placing the asynchronous task into a to-be-scheduled task queue of a first flow engine process to which the first thread belongs includes placing the asynchronous task into the to-be-scheduled task queue of the first flow engine process when it is obtained, by listening according to a registered transaction submission event callback listener, that the transaction executed by the first thread is submitted successfully.

According to a second aspect, a method for scheduling a business flow is provided, including determining that a transaction savepoint is configured on a to-be-scheduled node, creating an asynchronous task according to the transaction savepoint, where the asynchronous task includes a to-be-scheduled task that is on the to-be-scheduled node and that is after the transaction savepoint, using a first thread to execute a transaction that includes a task in the flow other than the asynchronous task, and submitting the transaction executed by the first thread, and using a second thread to execute the asynchronous task.

In a first possible implementation manner of the second aspect, after the submitting the transaction executed by the first thread, the method further includes placing the asynchronous task into a to-be-scheduled task queue of a first flow engine process to which the first thread belongs.

With reference to the first possible implementation manner of the second aspect, in a second possible implementation manner, the method further includes registering a transaction submission event callback listener, and the placing the asynchronous task into a to-be-scheduled task queue of a first flow engine process to which the first thread belongs further includes placing the asynchronous task into the to-be-scheduled task queue of the first flow engine process when it is obtained, by listening, that the transaction executed by the first thread is successfully submitted.

In a third possible implementation manner of the second aspect, after the creating an asynchronous task, the method further includes persisting the asynchronous task, and after the submitting the transaction executed by the first thread, the method further includes storing the persisted asynchronous task in a database, and when a first flow engine process to which the second thread belongs terminates exceptionally before execution of the asynchronous task is completed, acquiring, by a second flow engine process, the asynchronous task from the database and scheduling and executing the asynchronous task.

According to a third aspect, a flow scheduling apparatus is provided, which is configured to execute a flow, where the flow includes at least one node, and the flow scheduling apparatus includes a determining unit, a creation unit, and an execution unit, the determining unit is configured to determine that a transaction savepoint is configured on a to-be-scheduled node, the creation unit is configured to create an asynchronous task according to the transaction savepoint determined by the determining unit, where the asynchronous task includes a to-be-scheduled task that is on the to-be-scheduled node and that is after the transaction savepoint, and the execution unit is configured to use a first thread to execute a transaction that includes a task in the flow other than the asynchronous task, and submit the transaction executed by the first thread, and use a second thread to execute the asynchronous task.

According to a fourth aspect, a computer-readable storage medium is provided, where an instruction executable by a processor of a computer is stored in the computer-readable storage medium, and the instruction is used to execute the following steps determining that a transaction savepoint is configured on a to-be-scheduled node, creating an asynchronous task according to the transaction savepoint, where the asynchronous task includes a to-be-scheduled task that is on the to-be-scheduled node and that is after the transaction savepoint, using a first thread to execute a transaction that includes a task in the flow other than the asynchronous task, and submitting the transaction executed by the first thread, and using a second thread to execute the asynchronous task.

It can be learnt that, in the technical solutions of the embodiments of the present disclosure, a transaction savepoint is configured on a flow node, and a thread that executes a scheduled task other than an asynchronous task submits a transaction after completing the execution. Because the scheduled task other than an asynchronous task is submitted according to a transaction mechanism, data consistency is ensured. A new thread is used to schedule the asynchronous task after the transaction savepoint such that transaction splitting between tasks is implemented. When an exception occurs, flow scheduling terminates at the asynchronous task and execution is resumed from the asynchronous task upon recovery.

DESCRIPTION OF EMBODIMENTS

To make the objectives, technical solutions, and advantages of the present embodiment of the disclosure clearer and more comprehensible, the following further describes the present embodiment of the disclosure in detail with reference to the accompanying drawings and embodiments.

To implement that a transaction can be rolled back to an intermediate node instead of a start node of the transaction when execution of the transaction fails, it may be desirable to add a new transaction savepoint to a node in a flow, and persist each node separately. As a BPM engine drives a flow, when a transaction savepoint is encountered, a transaction prior to the transaction savepoint is submitted first, and then a new transaction is created to control execution of a subsequent node of a BPM flow.

Figure 1:
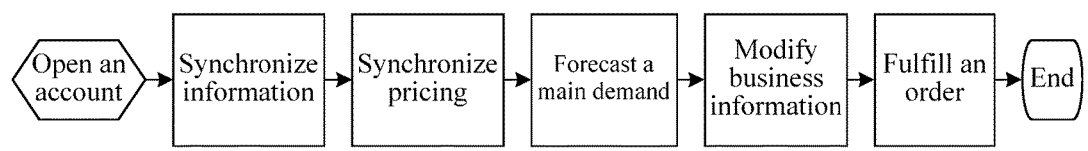
FIG. 1 is a schematic diagram of a prior-art typical business flow orchestrated using BPM.
Figure 2:
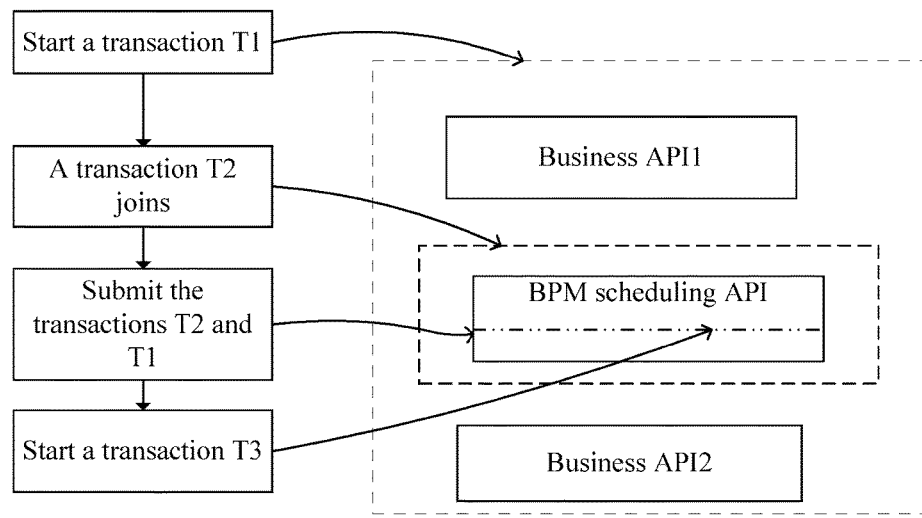
FIG. 2 is a schematic flowchart of transaction handling in which a transaction savepoint is used.

A specific implementation manner is described using a scenario shown in FIG. 2 as an example, where a business API1, a BPM scheduling API, and a business API2 are configured for a declarative transaction T1, where T1 is an outermost transaction. The business API1 and the business API2 are execution methods of a business, and the BPM scheduling API is a scheduling method of a platform. An inner-layer transaction T2 is preconfigured for the BPM scheduling API, and T2 joins in the business transaction T1 automatically. A transaction savepoint is preconfigured in the BPM scheduling API. According to the transaction savepoint, the inner-layer transaction T2 may be submitted earlier, and a new inner-layer transaction T3 is created for a remaining uncompleted part of a flow of the BPM scheduling API, where T3 controls flow of a subsequent node of the BPM flow. Because unified transaction management is used, T1 is submitted earlier when T2 is submitted while T3 is unable to manage the business API2 such that transaction management is absent for the business API2, resulting in data inconsistency. Therefore, this solution cannot ensure data consistency although a transaction can be rolled back to an exceptional node. To resolve the problem, in the embodiments of the present disclosure, a transaction that includes a task other than a to-be-scheduled task after a transaction savepoint is submitted first, and then a new thread is used to execute the to-be-scheduled task after the transaction savepoint in a flow in order to ensure data consistency between a business system and a BPM platform, and ensure that, when an exception occurs, the flow terminates at an exceptional node on which a transaction savepoint is configured, and that execution is resumed from the exceptional node upon recovery.

For ease of understanding, the terms flow, transaction, task, thread, and process are explained. Flow, transaction, and task are descriptions in respect of a business, and thread and process are descriptions in respect of machine execution. A flow is corresponding to an entire business and may include multiple tasks. A flow is managed by a process. One transaction is executed by one thread, and one thread may include multiple transactions. One transaction may include one or more tasks. When executed by a thread, a task is also referred to as a node. A task can be split. One process runs in one flow engine. One process may include multiple threads. A thread is driven by a process.

Figure 3:
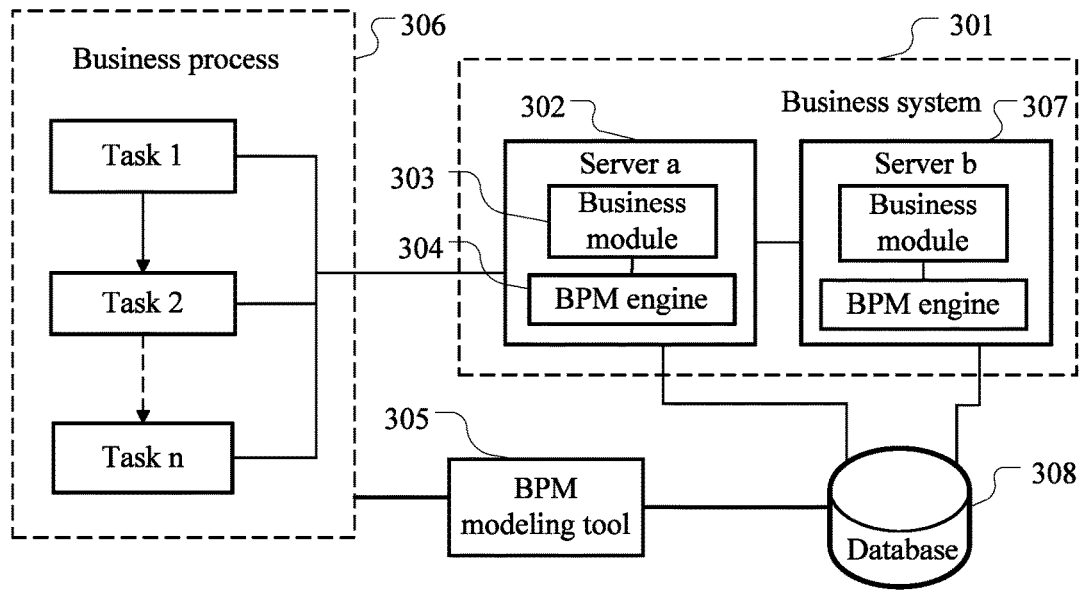
FIG. 3 is an architectural diagram of a BPM business application system according to an embodiment of the present disclosure.

FIG. 3 is an architectural diagram of a BPM business application system according to an embodiment of the present disclosure. A business system 301 is configured to complete orchestration, deployment, operation, and scheduling of business flows. The business system may be a cluster system, where the cluster system is a parallel or distributed system including interconnected computers. In an implementation manner, the business system 301 may include at least one server, for example, including a server a 302 and a server b 307. The server a 302 may further include a business module 303 and a BPM engine 304. The server b has a structure similar to that of the server a. The business module 303 is configured to receive a business request of a user and initiate, to the BPM engine 304, a business flow scheduling request. The BPM engine 304 is configured to read a flow definition from a database 308, to drive and schedule a flow. The database 308 stores the flow definition and related data.

A server in the business system 301 may further interact with a local business flow 306 or a third-party business system (not shown in the figure), to call a service in the local business flow 306 or the third-party business system. The business flow 306 includes at least one task. In an example shown in FIG. 3, the business flow 306 includes tasks 1 to n, where n is a natural number greater than 2. The business system 301 abstracts the business flow 306 using a BPM modeling tool 305, to generate a flow definition and stores the flow definition in the database 308. A transaction savepoint of a flow task is configured in the flow definition. The flow definition includes nodes corresponding to tasks in the flow, a relationship between the nodes, input/output data, a transaction savepoint, and the like. The flow definition may be expressed using a flowchart or a static configuration file, and is stored in the database 308 or a file system. When receiving a business scheduling request, the BPM engine of the server reads the flow definition to perform flow scheduling. If a scheduled node includes a transaction savepoint, an asynchronous task is created for a to-be-scheduled task after the transaction savepoint. Flow scheduling for the asynchronous task further includes a transaction is formed by a task other than the to-be-scheduled task after the transaction savepoint, and executed by a thread, and when the thread executing the transaction is ended, after the corresponding transaction is successfully submitted, the to-be-scheduled task after the transaction savepoint, which is the asynchronous task, is scheduled and executed by another thread. In addition, the asynchronous task is written into the database such that the asynchronous task can be acquired by a BPM engine process of another server when the process that executes the asynchronous task fails.

When an exception occurs in the flow scheduling for the asynchronous task by the business system 301, the thread that is in the BPM engine 304 and that executes the asynchronous task halts at a node on which the exception occurs instead of continuing the scheduling and execution. If the thread executing the asynchronous task is exceptional, the BPM engine acquires another idle thread from an asynchronous task scheduling thread pool to execute the asynchronous task in order to resume the execution of the asynchronous task. If the current BPM engine process terminates exceptionally, a BPM engine process of another server, for example, the server b, in the business system, learns this exceptional termination by monitoring or receives a notification message indicating that the BPM engine process in the server a has terminated exceptionally, then acquires the uncompleted asynchronous task from the database according to a takeover policy, and resumes execution of the task being executed by the BPM engine process that has terminated exceptionally.

Figure 4:
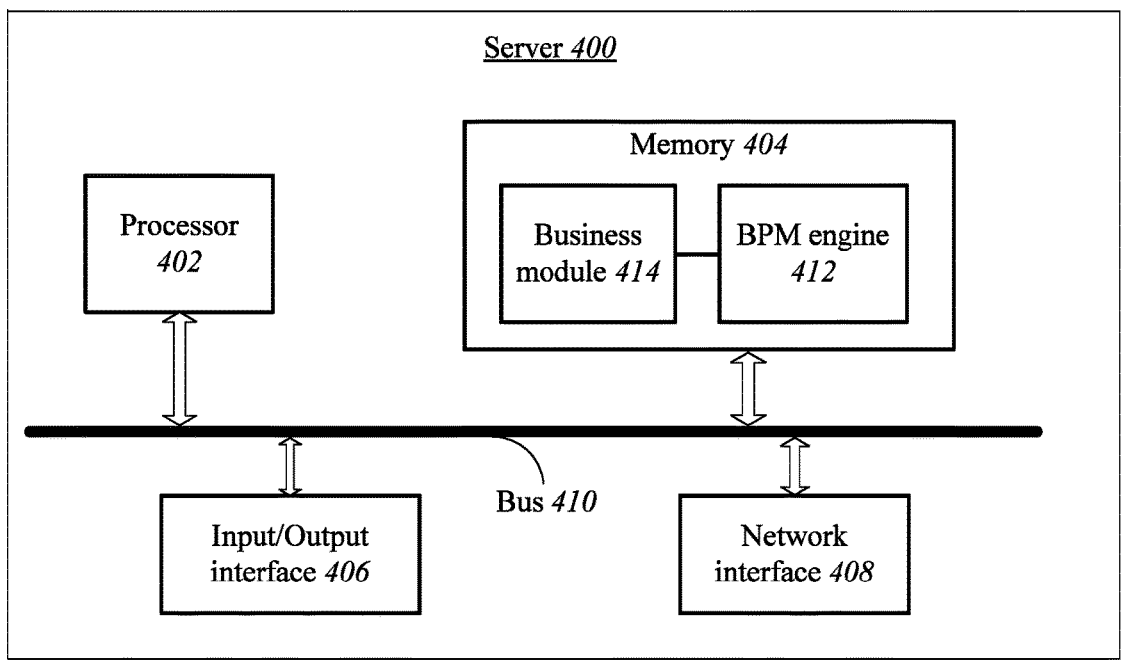
FIG. 4 is a schematic block diagram of a server in an application system according to an embodiment of the present disclosure.

FIG. 4 is a schematic block diagram of a server in a business system according to an embodiment of the present disclosure. In this embodiment, the server may be a computer device, which further includes a processor-based computer. As shown in FIG. 4, the server 400 may include a bus 410, a processor 402, a memory 404, an input/output interface 406, and a communications interface 408. The bus 410 may include a path through which information is transferred between all the components. The processor 402 is configured to process information and execute an instruction or operation, and may be specifically a general-purpose central processing unit (CPU), a microprocessor, an application-specific integrated circuit (ASIC), or one or more integrated circuits configured to control program execution of the solutions of the present disclosure. The server may further include one or more memories 404 configured to store information and instructions. The memory may be a read-only memory (ROM) or another type of static memory device capable of storing static information and instructions, a random-access memory (RAM) or another type of dynamic storage device capable of storing information and instructions, or a magnetic disk storage. These memories are connected to the processor 402 using the bus 410.

The input/output interface 406 may include an input apparatus or an output apparatus. The input apparatus is configured to receive data and information input by a user and is, for example, a keyboard, a mouse, a camera, a scanner, a light pen, a voice input apparatus, a touchscreen, or the like. The output apparatus is configured to allow information to be output or displayed to a user and includes a screen, a printer, a loudspeaker, and the like. The computer device further includes a network interface 408. The network interface is any transceiver-like apparatus used to facilitate communication with another device or communications network, such as Ethernet, a radio access network (RAN), or a wireless local area network (WLAN). The processor 402 can also be connected to the input/output interface 406 and the network interface 408 using the bus 410.

The memory 404 stores program instructions of the elements executing the solutions of the present disclosure, including programs of a business module 414 and a BPM engine 412. The memory 404 may further store an operating system and another application program. The processor 402 is configured to read and execute the program or instruction in the memory 404, and communicate with another device in the execution process using the network interface 408. Furthermore, when the processor 402 executes the instruction in the memory 404, the processor 402 can execute steps 601 to 604 shown in FIG. 6.

Figure 5:
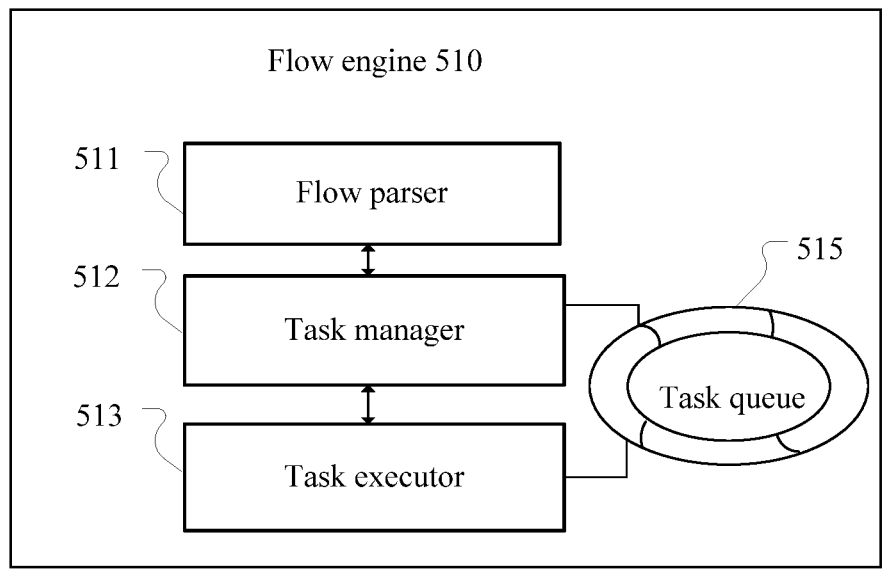
FIG. 5 is a schematic diagram of modules of a flow engine according to an embodiment of the present disclosure.

FIG. 5 is a schematic structural diagram of a flow engine, where the flow engine is the BPM engine 412 in FIG. 4. As shown in FIG. 5, the flow engine 510 includes a flow parser 511, a task manager 512, and a task executor 513. The flow parser 511 is configured to determine that a transaction savepoint is configured on a to-be-scheduled node. Furthermore, the flow parser 511 reads a flow definition from a database 308 and parses the flow definition to determine whether a transaction savepoint is configured on the to-be-scheduled node. During scheduling, when a preset transaction savepoint is found on a to-be-scheduled node, the task manager 512 creates an asynchronous task in a thread executing a currently scheduled flow node. The asynchronous task includes an unscheduled task after the transaction savepoint in the flow definition. The asynchronous task is not to be executed by the current thread, but is scheduled and executed by another thread, that is, a second thread, after the current thread is ended. The task manager 512 further persists the created asynchronous task for writing into the database.

The task manager 512 further registers a transaction submission event callback listener for a declarative transaction. The transaction submission event callback listener means that a pre-registered callback method is called once a transaction submission event is obtained by listening. A purpose of the transaction submission event callback listener is to ensure that scheduling of the asynchronous task takes place after a transaction prior to the transaction savepoint is submitted.

The thread executing the currently scheduled flow node is referred to as the current thread. After execution of one thread is completed, the thread returns to an outer-layer declarative transaction, the returning of the thread indicates that the thread is ended and a new thread can be started. When the current thread is ended, an outermost declarative transaction corresponding to the thread is submitted with the returning of the thread. Because the transaction submission event callback listener has been registered in advance, when obtaining, by listening, that an outer-layer transaction is submitted, the task manager 512 places, using the pre-registered callback method, the created asynchronous task into a to-be-scheduled task queue 515 of a home BPM engine process shared by threads. When the current thread is ended, the task manager 512 further writes the asynchronous task into the database synchronously. Task data in the task queue 515 is the same as task data in the database, while a difference lies in that the task in the task queue is temporarily stored in a memory, and the data in the database can be stored persistently. A thread in an asynchronous task scheduling thread pool may acquire an asynchronous task from the task queue for scheduling, and after the scheduling succeeds, deletes the asynchronous task from the database.

The task executor 513 is configured to use the second thread to execute the asynchronous task. A plurality of idle threads is applied in advance in the asynchronous task scheduling thread pool, waiting to be started. The second thread is acquired from the asynchronous task scheduling thread pool.

If, during scheduling of an asynchronous task, an exception occurs in a first BPM engine process that executes the asynchronous task, a second BPM engine process of another server learns, by monitoring, that the first BPM engine process is exceptional or receives a notification message indicating that the first BPM engine process has terminated exceptionally. The second BPM engine process acquires, from the database, the synchronous task that is not completed by the exceptional BPM engine process, and a task executor of the second BPM engine continues to execute the asynchronous task.

In this embodiment, a transaction savepoint is configured on a flow node such that a thread that executes a scheduled task other than an asynchronous task automatically returns to an outer-layer transaction after completing the execution. Because the outer-layer transaction is submitted according to a transaction mechanism, data consistency is ensured. A new thread is used to schedule an asynchronous task after the transaction savepoint such that transaction splitting between task nodes is implemented. When an exception occurs, flow scheduling terminates at the asynchronous task, and execution is resumed from the asynchronous task upon recovery. Besides, a high-performance flow execution solution is provided using an asynchronous task scheduling thread pool for scheduling.

Figure 6:
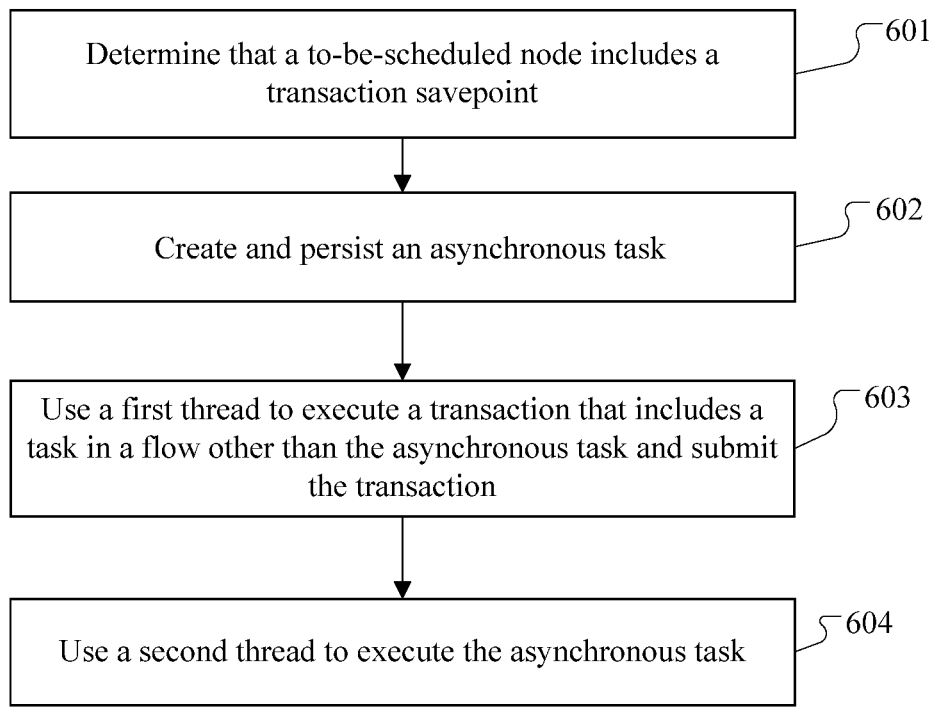
FIG. 6 is a flowchart of a flow scheduling method according to an embodiment of the present disclosure.

FIG. 6 is a flowchart of a flow scheduling method according to an embodiment of the present disclosure. The method described in the following may be executed by the server shown in FIG. 4 or the flow engine shown in FIG. 5.

Step 601: A flow engine determines that a transaction savepoint is configured on a to-be-scheduled node.

When a BPM modeling tool is used to construct a flowchart, a transaction savepoint is preconfigured between nodes or within a node in a flow. A configuration of the transaction savepoint is stored in a flow definition in a formatted way. If the flow definition is compliant with the Business Process Model and Notation (BPMN) specification, the transaction savepoint is stored using an extension attribute of an activity such as a service task.

For example, <startEventid="startSimple" name="Start" ufl:asynExecute="true"/>, where "asynExecute="true"" indicates that asynchronous scheduling may be required by the node and that a transaction savepoint is configured.

During scheduling, the flow engine finds, according to the flow definition, that a transaction savepoint is configured on a to-be-scheduled node. In an example in which an extensible markup language (XML) description is used to define a transaction savepoint, the XML description for the transaction savepoint may be placed at the beginning or in the middle of a definition description of a flow node. In either way, the flow engine can determine, by parsing, that a transaction savepoint is configured on the node.

Step 602: The flow engine creates an asynchronous task according to the transaction savepoint, where the asynchronous task includes a to-be-scheduled task that is in the flow definition, that is on the to-be-scheduled node, and that is after the transaction savepoint.

After the asynchronous task is created, the asynchronous task may further be persisted, which is specifically buffering the asynchronous task into a database storage interface for writing into a database.

Step 603: The flow engine uses a first thread to execute a transaction that includes a task in the flow other than the asynchronous task, and upon completion, submits the transaction.

The first thread is ended. The transaction, executed by the first thread, that includes a task in the flow other than the asynchronous task is completed and submitted. The submitted transaction includes a scheduled and executed task prior to the transaction savepoint, and may include a task node, after the transaction savepoint, in an outer-layer transaction other than the asynchronous task.

When the transaction executed by the first thread is submitted, the asynchronous task may be placed into a to-be-scheduled task queue of a first flow engine process to which the first thread belongs. The first flow engine process may be specifically a process run by a BPM engine. After the transaction executed by the first thread is submitted, the asynchronous task is further written into a database.

Step 604: The flow engine uses a second thread to execute the asynchronous task.

A new thread, that is, the second thread, is used in the first flow engine process to execute the asynchronous task in order to continue the scheduling of the flow. After the asynchronous task is successfully processed, the flow engine deletes the asynchronous task stored in the database.

If the second thread terminates exceptionally before execution of the asynchronous task is completed, the first flow engine process acquires another idle thread, that is, a third thread, from an asynchronous task scheduling thread pool, and uses the third thread to schedule the asynchronous task taken out of the to-be-scheduled task queue in order to resume the execution of the asynchronous task. If the first flow engine process terminates exceptionally, a second flow engine process learns, by monitoring, that the first flow engine process terminates exceptionally or receives a notification message indicating that the first flow engine process has terminated exceptionally, acquires the uncompleted asynchronous task from the database, and assigns a thread to schedule and execute the asynchronous task.

In this implementation manner of the present disclosure, a transaction savepoint is configured on a flow node, and an asynchronous task is scheduled using a different thread, which is asynchronous thread scheduling such that a thread that executes the node on which the transaction savepoint is configured automatically returns to an outer-layer transaction upon completion of the execution. Because the outer-layer transaction is submitted according to a transaction mechanism, data consistency is ensured. Further, a second thread is used to drive subsequent flow after the transaction savepoint, implementing transaction splitting between task nodes. When an exception occurs, flow scheduling terminates at the asynchronous task, and execution is resumed from the asynchronous task upon recovery. Besides, a high-performance flow execution solution is provided using an asynchronous task scheduling thread pool for scheduling.

Figure 7:
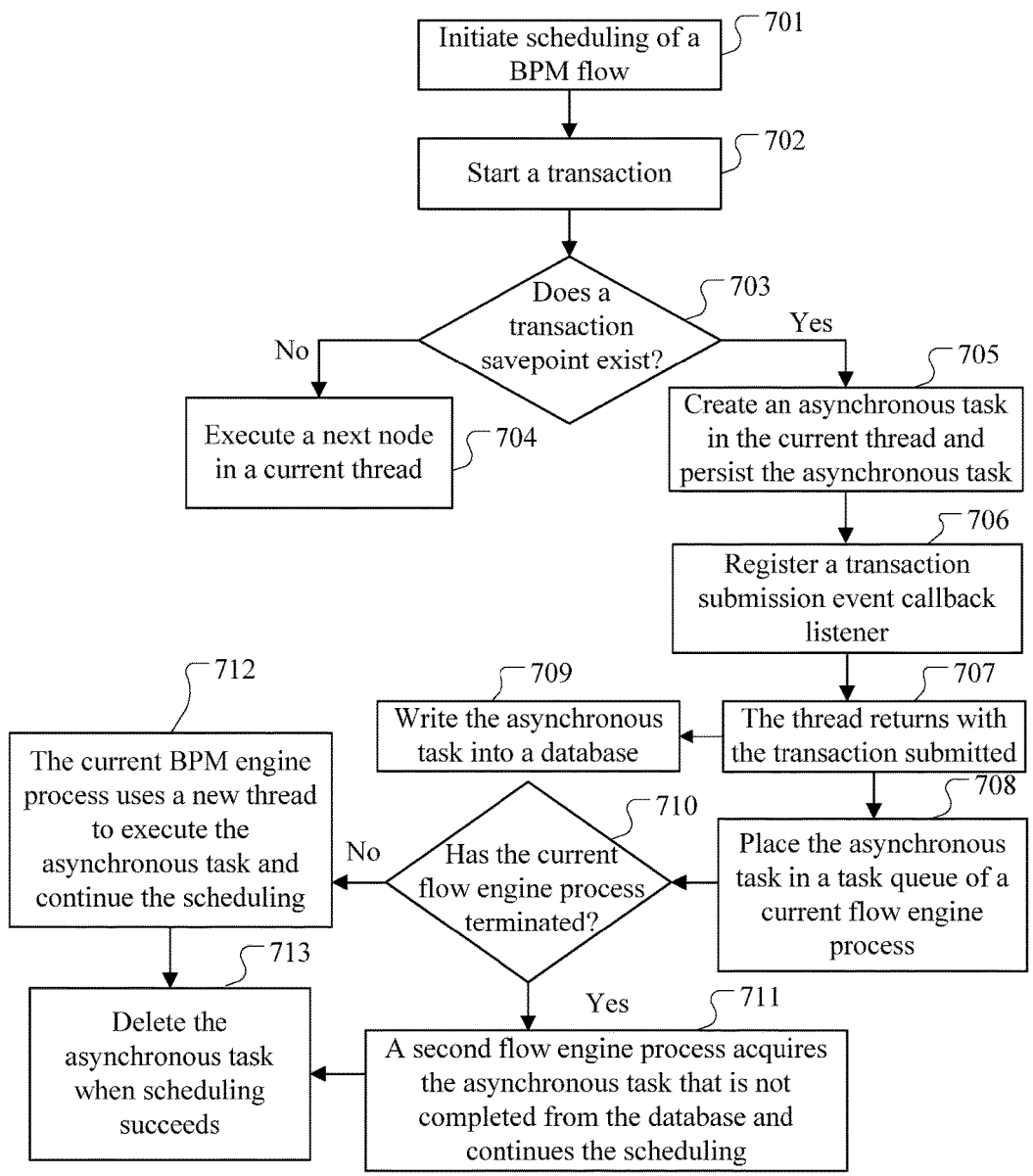
FIG. 7 is a flowchart of a flow scheduling method according to another embodiment of the present disclosure.

FIG. 7 is a flowchart of a specific procedure of flow scheduling according to an embodiment of the present disclosure. Execution of steps in this embodiment is described using an example in which a business API1, a BPM scheduling API, and a business API2 are included in a business flow, as shown in FIG. 2. A transaction savepoint is configured in the BPM scheduling API.

Step 701: A process of a BPM engine initiates flow scheduling.

Step 702: The BPM engine starts a transaction preconfigured in a flow definition. In this embodiment, a transaction T1 started by the BPM engine is configured to include a business API1, a BPM scheduling API, and a business API2, where the transaction T1 is also referred to as an outer-layer transaction below. The transaction T1 is executed by a thread, which is also referred to as a current thread below.

Generally, a transaction includes one or more tasks, the transaction is executed by one thread, and the thread is driven by a BPM engine process. A task, when being executed by a thread, is also referred to as a node.

Step 703: The BPM engine determines whether a to-be-scheduled node includes a transaction savepoint, and if the to-be-scheduled node does not include a transaction savepoint, proceed to step 704, or if the to-be-scheduled node includes a transaction savepoint, proceed to step 705.

In this embodiment, a transaction savepoint is preset in the BPM scheduling API.

Step 704: When the to-be-scheduled node does not include a transaction savepoint, the BPM engine continues to execute a next node in a current thread. The current thread is a thread that executes the currently scheduled flow node, that is, the first thread in the embodiment shown in FIG. 6.

Step 705: When finding a transaction savepoint on the to-be-scheduled node, the BPM engine creates an asynchronous task in the current thread and persists the asynchronous task. In this embodiment, the asynchronous task includes a to-be-scheduled task of the BPM scheduling API after the transaction savepoint. In this embodiment, persistence refers to buffering the asynchronous task into a database storage interface. A purpose of persistence is to store data, for example, an object in a memory, in a relational database, a disk file, or an XML data file.

Setting of the asynchronous task may be specifically an XML description, for example, bpmn2extn:nextFlowExecutionMode="ASYNCHRONOUS_CONTINUE".

Step 706: Register a transaction submission event callback listener. A thread starting method for the asynchronous task is defined in registration code of the callback listener. The transaction submission event callback listener ensures that a thread for the asynchronous task starts after a transaction in the current thread is submitted. The transaction submission event callback listener may be registered after step 705, or may be preconfigured in the flow definition.

Step 707: Upon completion of execution of the current thread, submit the outer-layer transaction T1 as the current thread returns. The submitted transaction T1 includes a business API1, a scheduled task for the BPM scheduling API prior to the transaction savepoint, and a business API2. A to-be-scheduled task for the BPM scheduling API after the transaction savepoint, which is an asynchronous task, is not executed or submitted.

Step 708: When the outer-layer transaction T1 is submitted, place the asynchronous task into a to-be-scheduled task queue of the current flow engine process according to a callback method of the registered transaction submission event callback listener. The task queue may be scheduled by a thread in an asynchronous task scheduling thread pool. A plurality of idle threads is applied in advance in the asynchronous task scheduling thread pool, waiting to be started.

Step 709: Write the asynchronous task further into a database when the outer-layer transaction T1 is submitted. After being written into the database, the asynchronous task can be stored persistently. A sequence of performing step 709 and step 708 is not limited.

Step 710: Monitor whether the current flow engine process terminates exceptionally, and if the process terminates exceptionally, execute step 711, or if the process runs normally, execute step 712.

Step 711: A second flow engine process acquires, from the database, the asynchronous task that is not completed by the exceptionally terminated flow engine process, and assigns a thread to continue the scheduling, and proceed to step 713 after completion. The second flow engine process actively monitors whether another flow engine process has terminated exceptionally, or the second flow engine process receives a notification message indicating that the first flow engine process has terminated exceptionally.

Step 712: The current BPM engine process uses a new thread (that is, a second thread) to execute the asynchronous task and continue the scheduling. The new thread is acquired from the asynchronous task scheduling thread pool. If the thread that executes the asynchronous task terminates exceptionally before execution of the asynchronous task is completed, the BPM engine takes another idle thread, that is, a third thread, out of the asynchronous task scheduling thread pool to execute the asynchronous task.

Step 713: Complete execution of the asynchronous task, and delete the asynchronous task in the database.

Figure 8:
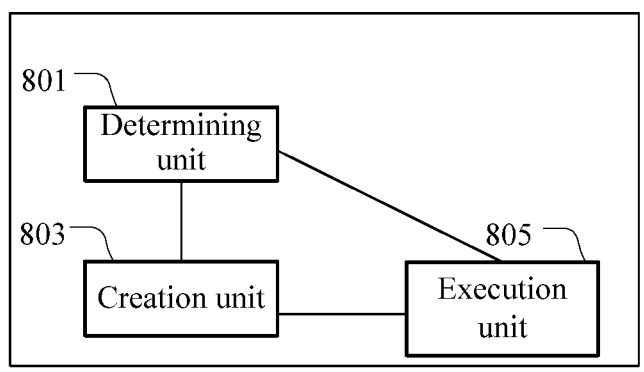
FIG. 8 is a schematic structural diagram of a flow scheduling apparatus according to an embodiment of the present disclosure.

Based on the foregoing flow scheduling method, FIG. 8 is a schematic structural diagram of composition of a flow scheduling apparatus according to an embodiment of the present disclosure. As shown in FIG. 8, the flow scheduling apparatus includes a determining unit 801, a creation unit 803, and an execution unit 805.

The determining unit 801 is configured to determine that a transaction savepoint is configured on a to-be-scheduled node.

The creation unit 803 is configured to create an asynchronous task according to the transaction savepoint determined by the determining unit 801, where the asynchronous task includes a to-be-scheduled task that is on the to-be-scheduled node and that is after the transaction savepoint.

The execution unit 805 is configured to use a first thread to execute a transaction that includes a task in a flow other than the asynchronous task, and submit the transaction executed by the first thread, and use a second thread to execute the asynchronous task.

The execution unit 805 is further configured to place, into a to-be-scheduled task queue of a first flow engine process to which the first thread belongs, the asynchronous task created by the creation unit.

The execution unit 805 is further configured to place the asynchronous task into the to-be-scheduled task queue of the first flow engine process when it is obtained, by listening according to a registered transaction submission event callback listener, that the transaction executed by the first thread is submitted successfully.

The execution unit 805 is further configured to persist the asynchronous task, store the persisted asynchronous task in a database after the transaction executed by the first thread is submitted such that when a first flow engine process to which the second thread belongs terminates exceptionally before execution of the asynchronous task is completed, a second flow engine process acquires the asynchronous task from the database and schedules and executes the asynchronous task.

The determining unit 801 determines the transaction savepoint according to the flow definition stored in the database.

It can be learnt that, according to the technical solution of this embodiment of the present disclosure, when a flow scheduling apparatus finds that a transaction savepoint is configured on a flow node, an asynchronous task is created, and asynchronous thread scheduling is used for the asynchronous task. A thread that executes a node on which a transaction savepoint is configured performs submission according to a transaction mechanism after execution of the thread is completed, which ensures data consistency. Further, a new thread is used to drive subsequent flow after the transaction savepoint, implementing transaction splitting between task nodes.

Content such as information exchange and an execution process between the units in the foregoing apparatus is based on a same idea as the method embodiments of the present disclosure. Therefore, for detailed content, reference may be made to descriptions in the method embodiments of the present disclosure, and details are not described herein again.

Specific embodiments are used in this specification to describe the principle and implementation manners of the present disclosure. The foregoing embodiments are merely intended to help understand the method and idea of the present disclosure. In addition, with respect to the implementation manners and the application scope, modifications may be made by a person of ordinary skill in the art according to the idea of the present disclosure. Therefore, the specification shall not be construed as a limitation on the present disclosure.

What is claimed is:

1. A flow scheduling apparatus configured to execute a flow, wherein the flow comprises at least two tasks, and wherein the flow scheduling apparatus comprises:
   a memory comprising instructions; and
   a processor coupled to the memory and configured to execute the instructions, which causes the processor to:
      determine that a transaction savepoint is in the flow;
      create an asynchronous task according to the transaction savepoint, wherein the asynchronous task comprises a to-be-scheduled task, and wherein the to-be-scheduled task is scheduled after the transaction savepoint;
      execute, by a first thread, a first transaction comprising a first task in the flow, wherein the first task is scheduled before the transaction savepoint in the flow;
      register a transaction submission event callback listener for the first transaction;
      submit the first transaction executed by the first thread;
      place, by the first thread, the asynchronous task into a to-be-scheduled task queue by listening according to the registered transaction submission event callback listener indicating that the first transaction is submitted successfully;
      obtain, by a second thread, the asynchronous task from the to-be-scheduled task queue;
      execute, by the second thread, a second transaction comprising the asynchronous task;
      persist the asynchronous task;
      store the persisted asynchronous task in a database after the first transaction executed by the first thread is submitted;
      acquire, by a second flow engine process, the asynchronous task from the database when a first flow engine process terminates exceptionally before execution of the asynchronous task is completed, wherein the second thread belongs to the first flow engine process;
      schedule, by the second flow engine process, the asynchronous task; and
      execute, by the second flow engine process, the asynchronous task.

2. The flow scheduling apparatus according to claim 1, wherein the instructions further cause the processor to be configured to:
   remove the asynchronous task from the to-be-scheduled task queue when the second thread terminates exceptionally before execution of the asynchronous task is completed; and
   execute, by a third thread, the asynchronous task.

3. The flow scheduling apparatus according to claim 1, wherein the instructions further cause the processor to be configured to store the transaction savepoint in a flow definition in the database.

4. The flow scheduling apparatus according to claim 1, wherein the transaction is a declarative transaction.

5. A method for scheduling a business flow, wherein the flow comprises at least two tasks, and wherein the method comprises:
   determining that a transaction savepoint is in the flow;
   creating an asynchronous task according to the transaction savepoint, wherein the asynchronous task comprises a to-be-scheduled task, and wherein the to-be-scheduled task is scheduled after the transaction savepoint;
   executing, by a first thread, a first transaction comprising a first task in the flow, wherein the first task is scheduled before the transaction savepoint in the flow;
   registering a transaction submission event callback listener for the first transaction;
   submitting the first transaction executed by the first thread;
   placing, by the first thread, the asynchronous task into a to-be-scheduled task queue by listening according to the registered transaction submission event callback listener indicating that the first transaction is submitted successfully;
   obtaining, by a second thread, the asynchronous task from the to-be-scheduled task queue;
   executing, by the second thread, a second transaction comprising the asynchronous task;
   persisting the asynchronous task;
   storing the persisted asynchronous task in a database after the first transaction executed by the first thread is submitted;
   acquiring, by a second flow engine process, the asynchronous task from the database when a first flow engine process terminates exceptionally before execution of the asynchronous task is completed, wherein the second thread belongs to the first flow engine process;
   scheduling, by the second flow engine process, the asynchronous task; and
   executing, by the second flow engine process, the asynchronous task.

6. The method according to claim 5, further comprising:
   removing the asynchronous task from the to-be-scheduled task queue when the second thread terminates exceptionally before execution of the asynchronous task is completed; and
   executing, by a third thread, the asynchronous task.

7. The method according to claim 5, further comprising storing the transaction savepoint in a flow definition in the database.

8. A computer program product comprising computer executable instructions stored on a non-transitory computer readable medium such that when executed by a processor, cause the processor to execute a method for scheduling a flow comprising at least two tasks, wherein the method comprises:
   determining that a transaction savepoint is in the flow;
   creating an asynchronous task according to the transaction savepoint, wherein the asynchronous task comprises a to-be-scheduled task, and wherein the asynchronous task is scheduled after the transaction savepoint;
   executing, by a first thread, a first transaction that comprises a first task in the flow, wherein the first task is scheduled before the transaction savepoint in the flow;
   registering a transaction submission event callback listener for the first transaction;
   submitting the first transaction executed by the first thread;
   placing, by the first thread, the asynchronous task into a to-be-scheduled task queue by listening according to the registered transaction submission event callback listener indicating that the first transaction is submitted successfully;
   obtain, by a second thread, the asynchronous task from the to-be-scheduled task queue;
   executing, by the second thread, a second transaction comprising the asynchronous task;

persisting the asynchronous task;

storing the persisted asynchronous task in a database after the first transaction executed by the first thread is submitted;

acquiring, by a second flow engine process, the asynchronous task from the database when a first flow engine process terminates exceptionally before execution of the asynchronous task is completed, wherein the second thread belongs to the first flow engine process;

scheduling, by the second flow engine process, the asynchronous task; and executing, by the second flow engine process, the asynchronous task.

9. The computer program product according to claim 8, wherein the method further comprises:

removing the asynchronous task from the to-be-scheduled task queue when the second thread terminates exceptionally before execution of the asynchronous task is completed; and executing, by a third thread, the asynchronous task.

10. The computer program product according to claim 8, wherein the method further comprises storing the transaction savepoint in a flow definition in the database.

11. The computer program product according to claim 8, wherein the transaction is a declarative transaction.

* * * * *